(12) United States Patent
Hoover et al.

(10) Patent No.: US 10,325,222 B2
(45) Date of Patent: Jun. 18, 2019

(54) DECISION TREE MACHINE LEARNING

(71) Applicant: Accenture Global Services Limited, Dublin (IE)

(72) Inventors: James Hoover, Mechanicsburg, PA (US); Jeffrey Scott Miller, Fairfax Station, VA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 563 days.

(21) Appl. No.: 15/018,345

(22) Filed: Feb. 8, 2016

(65) Prior Publication Data

US 2016/0155070 A1    Jun. 2, 2016

Related U.S. Application Data

(63) Continuation of application No. 13/491,146, filed on Jun. 7, 2012, now abandoned, which is a continuation
(Continued)

(51) Int. Cl.
| | |
|---|---|
| *G06Q 30/00* | (2012.01) |
| *G06N 20/00* | (2019.01) |
| *G06F 16/25* | (2019.01) |
| *G06F 16/26* | (2019.01) |
| *G06F 16/21* | (2019.01) |
| *G06F 16/242* | (2019.01) |

(Continued)

(52) U.S. Cl.
CPC ........... *G06N 20/00* (2019.01); *G06F 3/0481* (2013.01); *G06F 16/212* (2019.01); *G06F 16/243* (2019.01); *G06F 16/2455* (2019.01); *G06F 16/25* (2019.01); *G06F 16/26* (2019.01); *G06N 5/04* (2013.01); *G06N 5/045* (2013.01); *G06Q 10/067* (2013.01); *G06Q 10/0635* (2013.01); *G06Q 30/0201* (2013.01); *G06Q 30/0206* (2013.01); *G06Q 30/06* (2013.01); *G06Q 30/0611* (2013.01); *G06Q 30/08* (2013.01)

(58) Field of Classification Search
None
See application file for complete search history.

(56) References Cited

U.S. PATENT DOCUMENTS

| | | |
|---|---|---|
| 6,937,994 B1 | 8/2005 | Iyengar |
| 7,272,579 B1 | 9/2007 | Canali et al. |

(Continued)

OTHER PUBLICATIONS

Akira Ikeda, "A Study of Institutional Design on Government Procurement Accompanying Development in Multi-agent Simulation", Information Processing Society of Japan Journal of Information Processing, vol. 49, No. 7 [CD-ROM, Japan, Information Processing Society of Japan, Jul. 15, 2008, vol. 49, pp. 2731-2740, with English abstract.

(Continued)

*Primary Examiner* — Mila Airapetian
(74) *Attorney, Agent, or Firm* — Mannava & Kang, P.C.

(57) ABSTRACT

Embodiments may include machine learning, including decision tree machine learning. Predictive variables may be selected for the machine learning through an iterative process. Predictive power of the predictive variables and collinearity between the predictive variables may be considered when selecting a set of the predictive variables for the machine learning.

16 Claims, 17 Drawing Sheets

Related U.S. Application Data of application No. 14/989,572, filed on Jan. 6, 2016, now Pat. No. 9,978,021, which is a continuation of application No. 13/491,146, filed on Jun. 7, 2012, now abandoned.

(60) Provisional application No. 61/494,839, filed on Jun. 8, 2011.

(51) Int. Cl.

| | | |
|---|---|---|
| *G06F 16/2455* | (2019.01) | |
| *G06Q 30/06* | (2012.01) | |
| *G06F 3/0481* | (2013.01) | |
| *G06Q 10/06* | (2012.01) | |
| *G06N 5/04* | (2006.01) | |
| *G06Q 30/02* | (2012.01) | |
| *G06Q 30/08* | (2012.01) | |

(56) References Cited

U.S. PATENT DOCUMENTS

| | | | |
|---|---|---|---|
| 7,349,880 | B1 | 3/2008 | Kitao |
| 7,747,339 | B2 | 6/2010 | Jacobus et al. |
| 7,747,500 | B2 | 6/2010 | Hwang |
| 7,870,012 | B2 | 1/2011 | Katz et al. |
| 8,374,956 | B2 | 2/2013 | Alvin |
| 8,725,666 | B2 | 5/2014 | Lemmond et al. |
| 9,053,391 | B2 | 6/2015 | Wang et al. |
| 2002/0077867 | A1 | 6/2002 | Gittins et al. |
| 2002/0128938 | A1 | 9/2002 | Schofield et al. |
| 2005/0234753 | A1* | 10/2005 | Pinto ............... G06Q 10/04 700/44 |
| 2006/0047598 | A1 | 3/2006 | Hansen |
| 2006/0085323 | A1 | 4/2006 | Matty et al. |
| 2006/0136325 | A1 | 6/2006 | Barry et al. |
| 2006/0229957 | A1 | 10/2006 | Broadwell et al. |
| 2008/0077544 | A1* | 3/2008 | Sureka ............... G06K 9/6253 706/13 |
| 2008/0249764 | A1 | 10/2008 | Huang et al. |
| 2009/0018982 | A1 | 1/2009 | Morrison |
| 2009/0222297 | A1 | 9/2009 | Cao et al. |
| 2010/0161591 | A1* | 6/2010 | Jones ............... G06F 17/30241 707/722 |
| 2011/0153683 | A1 | 6/2011 | Hoskinson |
| 2011/0246262 | A1 | 10/2011 | Pepper et al. |
| 2012/0054184 | A1* | 3/2012 | Masud ............... G06F 17/30598 707/737 |
| 2012/0226645 | A1* | 9/2012 | O'Rourke ............... G06Q 40/06 706/46 |

OTHER PUBLICATIONS

Taizo Moroyama, "This is How Internet Scam Work! Know about Internet Scams Methods and Take Full Measures Not to be Tricked", PC Japan, vol. 10, No. 10, Japan, SoftBank Publishing Inc., Oct. 1, 2005, vol. 10, pp. 105-110.

English translation of "Notice of Reasons for Refusal", Japan Patent Office search report on patent application No. JP-2012-130531, Jul. 30, 2013.

* cited by examiner

FIG. 9

Display RFx: 3621401406

| PR | 43569338 | PR Status SQL_SAV | PR Value 440,863.00 | Ext PR | | PR Created 3/10/2012 | Buyer HBG PARFEC06 |
| RFx | 4000001249 | RFx PHN SPE4A712R001 | RFx Value 396,776.88 | Closing 5/1/2012 | | PR Status Saved | Supplier |
| Award | | AWD PHN | AWD Value | AWD Date | | Awd Status | Admin |

[ Edit ] [ Close ] | [ Refresh ] | [ Copy ] [ Check ] [ Export ] [ Print Preview ]

/ RFX Information \ / Bidders \ / Items \ / Notes and Attachments \ / Approval \ / Tracking \

▼ Bidder Overview

Add Bidder by Company ID [          ] [ Add ] [ Search for Bidders ] [ Send Notifications ] [ Output Medium ] [ Delete ]

| Company Name | Contact | Country | Company | Bidder ID | Phone | Output Medium | HRP Score | Risk Factor |
|---|---|---|---|---|---|---|---|---|
| James Brothers Construction | Default Contact for 0000077445 | US | 77445 | 5000174010 | 8605653696 | XML | 987 | Price |
| Quincy Engineering | Default Contact for 0000065065 | US | 65065 | 5000170736 | 6167487714 | XML | 810 | Supplier |
| F&T Sales & Service | Default Contact for 0000052661 | US | 52661 | 5000164661 | 8605650585 | XML | 930 | Price |

FIG. 12b

Analysis Report

File Edit View Data | Bid Risk Profile | Price Risk | Supplier Risk | Item Risk
Edit | View

Item Risk Overview

| Fsc Group | Fsc Item | Fsc | Niin |
|---|---|---|---|
| Pipe, Tubing, Hose, and Fittings | Pipe, Tube, Hose, and Rigid Tubing | 14130 | 018669767 |

Item Flag Summary

| Company | Num Item Risk Flags | Supplier Item Risk | Item Score |
|---|---|---|---|
| F&T Sales & Service | 6 | Med | 382 |
| James Brothers Construction | 5 | Med | 371 |
| Quincy Engineering | 0 | Low | 0 |

Key Item Risk Flags

| Company | Previous Counterfeit Item | Suspended Item | Microcircuit | Supplier Item Risk High | Price Too Low |
|---|---|---|---|---|---|
| F&T Sales & Service | GREEN | GREEN | GREEN | GREEN | GREEN |
| James Brothers Construction | GREEN | GREEN | GREEN | RED | GREEN |
| Quincy Engineering | GREEN | GREEN | GREEN | GREEN | GREEN |

Notes

| Company | Item Reason codes |
|---|---|
| F&T Sales & Service | High Dollar Buy |
| James Brothers Construction | Item has price higher than before |
| Quincy Engineering | |

Suggested Actions [Item]
Consider adding certification of authenticity requirement.
Consider adding clause to ensure supplier knows certification of origin required
Consider first article Test and Use of testing labs

*FIG. 13*

DECISION TREE MACHINE LEARNING

PRIORITY

This patent application is a Continuation of pending U.S. patent application Ser. No. 13/491,146, filed Jun. 7, 2012, which claims priority to U.S. provisional patent application Ser. No. 61/494,839, filed on Jun. 8, 2011. Also, this patent application is a Continuation of pending U.S. patent application Ser. No. 14/989,572, filed Jan. 6, 2016, which is a Continuation of pending U.S. patent application Ser. No. 13/491,146, filed Jun. 7, 2012, which claims priority to U.S. provisional patent application Ser. No. 61/494,839, filed on Jun. 8, 2011. All of the above-referenced patent applications are incorporated by reference in their entireties.

GOVERNMENT RIGHTS

This invention was made with government support under contract number SP4701-07-A-001 awarded by the Defense Logistics Agency. The government has certain rights in the invention.

TECHNICAL FIELD

Embodiments are directed to machine learning, including decision tree machine learning.

BACKGROUND

Historically, an area of great concern to government and industry has been the identification of high-risk procurements. An example of a high-risk procurement may be paying an exuberant amount of money per item, such as $150.00 per screwdriver, when these items may be purchased off-the-shelf for a fraction of the cost.

High-risk procurements have a high probability of outside scrutiny, and potentially represent a risk for fraud, waste and abuse. High-risk procurements in the past have resulted in negative publicity and investigations that consume considerable leadership time and taxpayer dollars.

Procurements may be monitored based on the dollar value of each procurement. This type of monitoring has made sense in a procurement environment where thousands of procurements pass through the procurement process to award each day. However, when considering past procurements that have resulted in extensive outside scrutiny and consumed considerable leadership time to address them, not all of these procurement actions have fit the high dollar value model. For example, post-procurement accountability auditing may uncover a $20 procurement for an ice cube tray. Because the $20 value is not a high dollar amount, it may not be flagged by the typical monitoring process when the procurement occurred. In an environment where there are thousands of procurements, these type of high-risk procurements may be vast and result in a significant amount of unnecessary expenditures.

SUMMARY

According to an embodiment, a procurement analysis system may include a network interface to interface with one or more data sources over a network to receive procurement data. The system may include a data storage device to store model building data sets determined from the procurement data, and a model generator module, which may be executed by a processor, to determine procurement scoring models from the model building data sets and to store the procurement scoring models in the data storage. The procurement scoring models may include a price risk scoring model, a supplier risk scoring model and an item risk scoring model, and the procurement risk analysis module may determine a scoring scale of scores associated with each procurement scoring model and determine a threshold for each scale identifying a high-risk procurement. The scoring scale and the threshold may be the same for each of the scoring models.

The system may also include a procurement risk analysis module, which may be executed by the processor, to determine an evaluation capacity to review bids for a procurement, and to evaluate bids for the procurement based on the procurement scoring models and the evaluation capacity to identify high-risk procurements associated with the evaluated bids. The system may include a dashboard comprised of a graphical user interface to provide illustrations of price risk, supplier risk and item risk for the bids based on the evaluation of the bids.

In another embodiment, a procurement analysis system may include a network interface to interface with one or more data sources over a network to receive procurement data, a data storage device to store model building data sets determined from the procurement data, and a model generator module to determine procurement scoring models from the model building data sets and store the models in the data storage. The system may also include a procurement risk analysis module to determine an evaluation capacity to review bids for a procurement, and to evaluate bids for the procurement based on the procurement scoring models and the evaluation capacity to identify high-risk procurements associated with the evaluated bids.

In yet another embodiment, a method of identifying high-risk procurements may include interfacing with one or more data sources over a network to receive procurement data; creating a data structure in a data storage device to store at least some of the procurement data; storing model building data sets in the data structure in the data storage device, wherein the model building data sets are determined from the procurement data; determining procurement scoring models from the model building data sets; determining an evaluation capacity to review bids for a procurement; and evaluating bids for the procurement based on the procurement scoring models and the evaluation capacity to identify high-risk procurements associated with the evaluated bids.

One or more of the steps of the method may be performed by a processor. The steps may be embodied as machine readable instructions stored on a computer readable medium and executable by a processor to perform the steps.

BRIEF DESCRIPTION OF DRAWINGS

Embodiments are described in detail in the following description with reference to the following figures. The embodiments are illustrated by examples shown in the accompanying figures in which like reference numerals indicate similar elements.

FIGS. 9-13 show examples of screenshots that may be generated by the high-risk procurement analytics and scoring system or other systems.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

According to an embodiment, advanced analytic techniques, including data mining and modeling, are used to identify characteristics of high-risk procurements and develop scoring models that capture the relative risk related to characteristics of high-risk procurements. The characteristics and their relationships are quantified to generate scoring models that grade each procurement. A high-risk procurement is a procurement having characteristics that meet certain criteria. The criteria may be related to identifying fraud, abuse, or general errors. A procurement is the acquisition of items, which may include one or more goods or services. A typical procurement process includes accepting bids to supply items from suppliers and selecting one or more bids for the procurement of the items. The procurement process may include posting a request for bids or proposals that provides a description of the items being procured and any constraints on the procurement. According to an embodiment, a system evaluates bids according to scoring models to determine if they are high-risk prior to being accepted.

The scoring models can be incorporated into (or used with) a procurement system and ultimately into a workflow for procurement specialists and leadership. As a result, entities acquiring goods or services through a procurement process can have visibility into high-risk procurements early in the procurement process while there is still time to proactively react. This reduces procurement request risk exposure. Also, procurement request risk may be tracked as a metric. Other metrics may also be captured for each procurement.

For entities reviewing a procurement process, the risk reduction efforts of the embodiments described herein become a visible step taken to reduce risk, and the availability for metrics leads to opportunities for management to address pockets of risk where they are occurring (e.g. by supply chain). Also, by tracking metrics on high-risk procurements, trends can be tracked over time and evaluated to determine whether or not, policy, system or personnel efforts to reduce high-risk procurements are creating the desired outcome.

Figure 1:
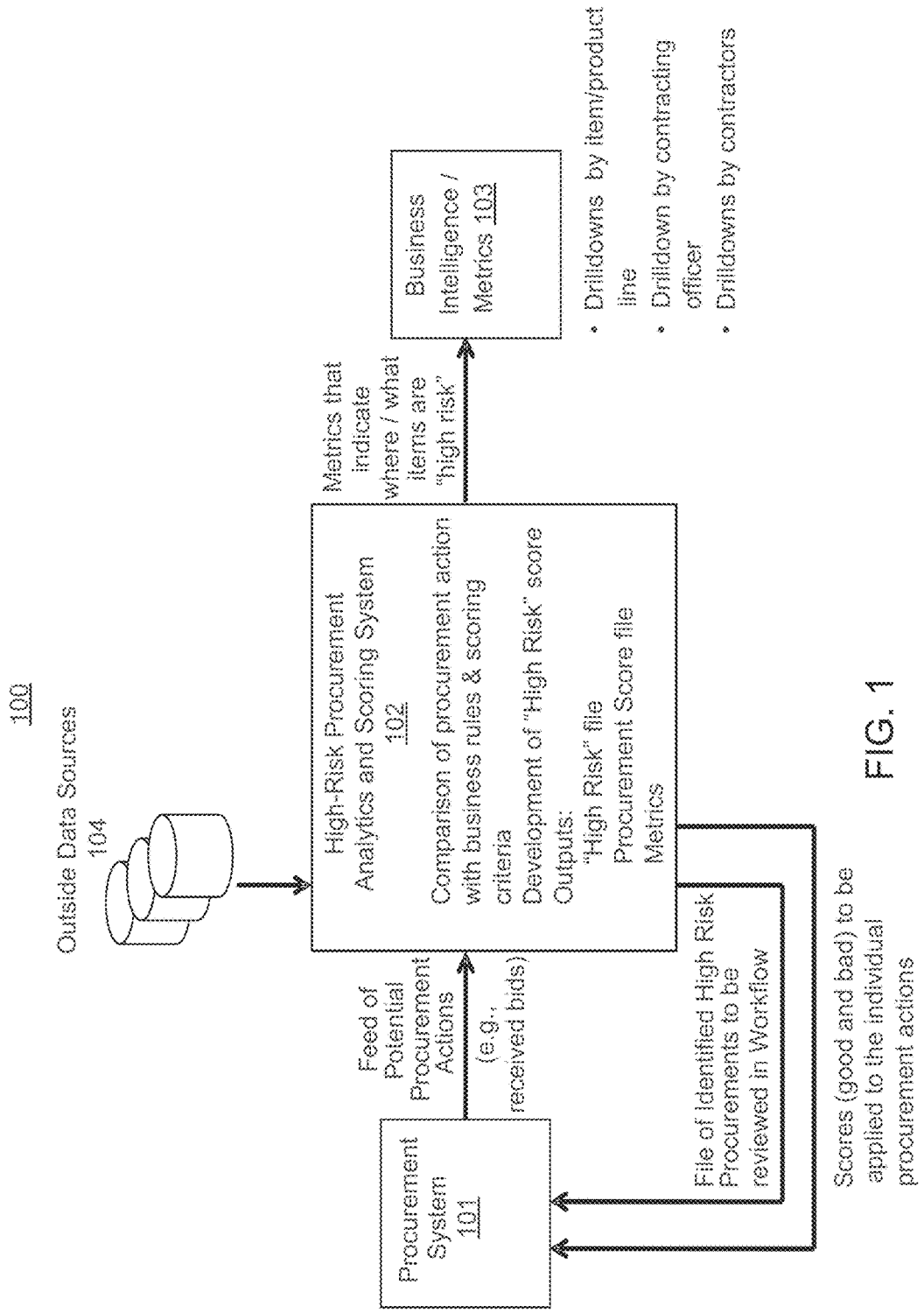
FIG. 1 illustrates a system, according to an embodiment.

FIG. 1 illustrates a system 100, according to an embodiment. The system 100 includes a procurement system 101 and data sources 104 that provide data to a high-risk procurement analytics and scoring system 102. The data sources 104 are shown as outside data sources but may also include data sources internal to the system 100, such as internal enterprise applications or a data repository maintained internally by the procuring company or government that stores procurement activity over time. The system 102 develops one or more scoring models and uses the scoring models to identify high-risk procurements from "live" data. The feed of potential procurement actions may include the live data that is sent to the system 102 for scoring and to identify high-risk procurements. The system 102 may interface with the data sources 104 over a network, which may include the Internet to receive procurement data. Procurement data includes any data that may be used for generating the models and evaluating bids for the procurement.

Business rules, logistic regression and scoring criteria may be used for developing scoring models and/or scoring procurements. The output of the system 102 may include scoring models, a high-risk file identifying high-risk procurements, a procurement score file identifying scores for procurements, and metrics 103. The high-risk procurements identified in the high-risk file sent to the procurement system 101 may continue to be evaluated in a workflow used by the procurement system 101 before the procurement process is closed. For example, procurements flagged as high-risk may be given further analysis to determine whether they can be accepted or denied. The metrics 103 may be displayed via a dashboard or provided to the procurement system 101 for further evaluation.

Also, scores in the procurement score file may include good scores as well as bad scores. These scores may eventually be used to create or update scoring models or used for additional analytics. The scores may be comprised of multiple elements related to the procurement. Metrics may indicate where and what items are high-risk. This may include drill downs by item/product line, drill downs by contracting officers, drill downs by contractors, etc. The metrics may be included in daily or periodic reporting of the scores to the user. The metrics may be used to identify trends that warrant further analysis, such as whether a particular geographic region or procurement officer is associated with an unusually high number of high-risk procurements.

Figure 2:
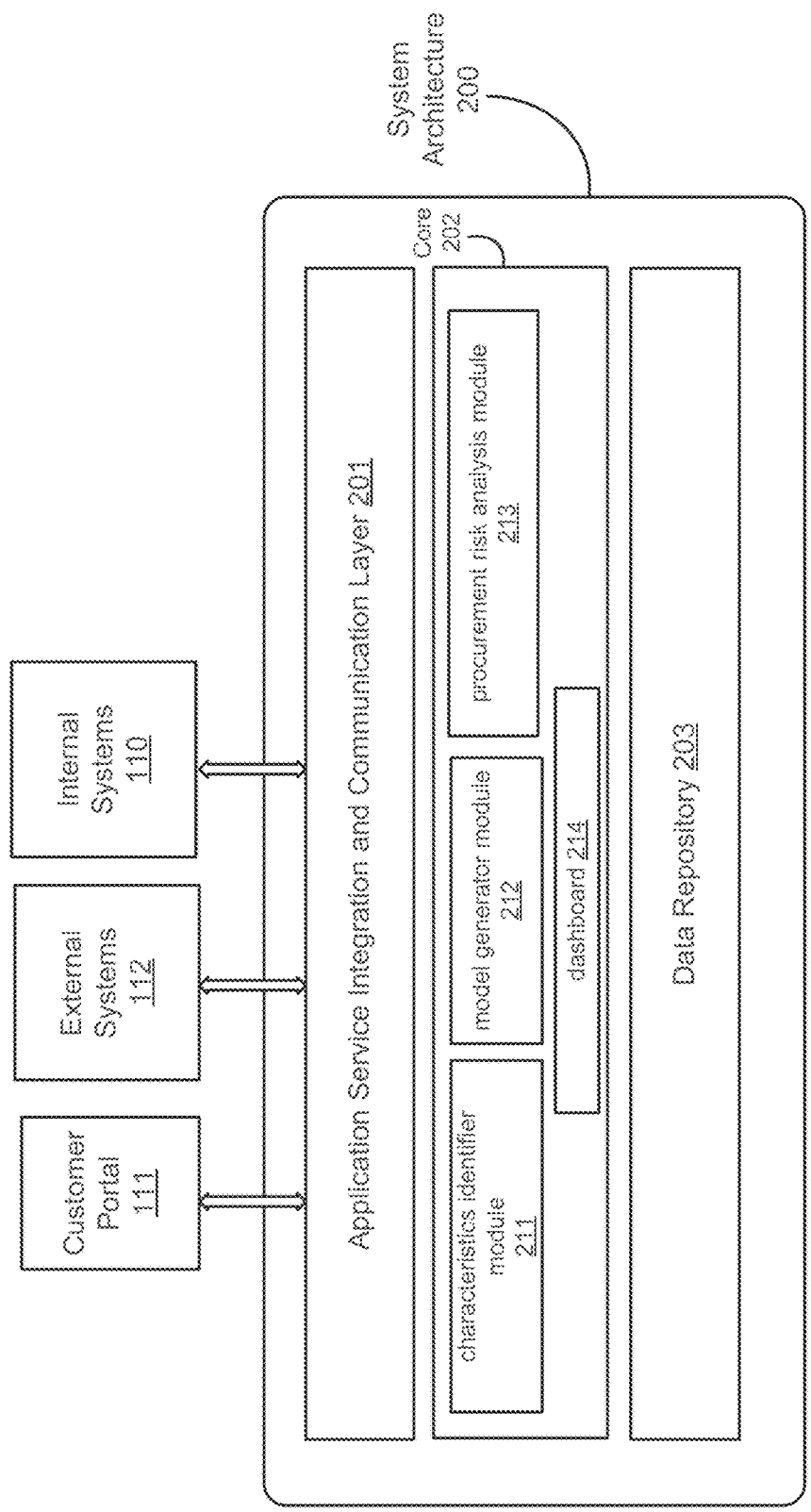
FIG. 2 illustrates a system architecture of a high-risk procurement analytics and scoring system.

FIG. 2 illustrates a system architecture 200 of the high-risk procurement analytics and scoring system 102. The system 102 may be implemented as software stored on a non-transitory computer readable medium and executed by one or more processors. The architecture 200 may represent a software architecture.

The architecture 200 includes an application service integration and communication layer 201, a core 202 and data repository 203 including data structures storing procurement data on one or more storage devices. The application service integration and communication layer 201 supports data collection from internal systems 110 of a user, which may include enterprise applications. The internal systems 110 may be part of the data sources 104. The layer 201 may also provide secured access with user/customer portals 111 and external systems 112, which may also be part of the data sources 104. The layer 201 may utilize a full featured web services library to support the user/customer portals 111 and external third party portals and systems 212. Generally, the layer 201 provides a mechanism for interfacing with the different systems and web interfaces.

The layer 201 provides data collection from enterprise resources and other sources in the internal system 210. The layer 201 may include application program interfaces (APIs) to communicate with the internal systems 110. For example, the layer 201 receives data from the enterprise applications, for example, through APIs or other interfaces and may normalize the data for storage in data repository 203. Normalizing may include formatting according to predetermined schemas. The layer 201 maps the received data to schemas of data structures, which may include tables in the data repository 203 based on the determined types and fields. Then, the data may be stored in the tables in the data repository 203. The data repository 203 may include a database using the tables.

Some of the information stored in the data repository 203 may include procurement data, which may gathered from the data sources 104, which may be internal or external. The stored information may include model building data sets and validation data sets, which may be determined from the procurement data or other data received at the system 102. Other stored information may include models generated by the system 102, business rules for the models and bid evaluation, evaluation capacities, information describing procurements (e.g., items being procured and constraints for bids), and information from received bids.

The core 202 performs the functions of the system 102. The core 202 may perform the methods described in detail below, including processes for model building and bid evaluation.

The core 202 may include a characteristics identifier module 211, a model generator module 212, a procurement risk analysis module 213 and a dashboard 214. The characteristics identifier module 211 identifies characteristics of high-risk procurements. Machine learning, such as neural networks, may be used to identify the characteristics. The characteristics may include variables for generating the models including variables related to cost, quantity, industry-specific characteristics, etc.

The characteristics may include "should cost" data tables that include information on how much an item should cost. A "should cost" table may include information about how much similar item costs (e.g., in ranges from "low cost", median cost, and "high cost"). This information may be gleaned from the data sources 104, which may include other procurement organizations or from organizations that do strategic sourcing across the globe. These costs may be related to a specific geographic location, recognizing that costs vary based on where you are buying something. Costs may vary by industry or other categories. Comparisons that match the nomenclature of the data from a procurement action with nomenclature from a should cost table may be considered candidate for high-risk.

Another characteristic for comparison may be company location and production information for companies that are bidding on a procurement. In one example whereby the United States (U.S.) government is procuring items, company data could be linked to "Buy American Act" decisions. For example, if the company doesn't have primary production facilities in the U.S., then the company would likely have to sub-contract out the work to a U.S. company or work the production into their facilities inside the United States. Other procurement rules may be identified to determine whether a company may have the characteristics to meet the criteria specified in the rules.

Network analysis could be used to identify companies that have "close associations" with companies that either have unscrupulous partner companies or represent potential conflicts of interest or other violations. For example, network analysis may be used to identify companies that have violated the Foreign Corrupt Practices Act (bribery or corruption), or companies that have been accused of providing counterfeit goods. Network analysis may be performed by external providers or internal systems.

Former bids and bid rules can also be incorporated as a component. For example, rules can be built into the system 102 that indicate that for buys of $20,000 or more, if 2 or more bids are not received then it identifies the procurement as a "high-risk" procurement that requires manual review by someone other than the individual who was the initial buyer. Former bids can be used to indicate another range of plausible dollar values for a procurement.

A review of previously identified "high-risk" procurements produces a "domain" of potential rule based structures that can be utilized as rules for identifying high-risk procurements. In "machine learning" or database mining activities, these are normally applied in a decision tree based approach. These rules are developed by the characteristics identifier module 211, for example, using one or more of the characteristics described above. The rules may be developed on a model building data set, which may be received from the system 101 or another data source and then tested on a validation data set. The scoring model may be generated based on the rules, and the procurement risk analysis module 213 uses the scoring model to score procurements and identify high-risk procurements.

The model generator module 212 generates the scoring models. Scoring models may be generated for different risk areas. The models may be generated using logistic regression, business rules or other model building techniques based on variables. Information for the variables may be received from the data sources 104. In one example of using logistic regression is performed by a processor to build a multivariate model. For example, predictive variables, i.e., covariates, are selected and a model is generated using the variables. A variable is removed and the model is refitted to determine if the new model is different by than the old model. If so, the variable is considered important and is kept. This process is repeated until the variables are determined for the model. Examples of the models are further described below.

The dashboard 214 may present information related to the bid evaluation. For example, the procurement risk analysis module 213 evaluates the received bids for a procurement based on the scoring models. Evaluation results and identification of high-risk bids may be presented via the dashboard 214. The dashboard 214 may comprise a graphical user interface presented on a computer screen. The computer screen may be a display provided as an input/output device in the computer system 300 described below. The dashboard 214 may provide graphical illustrations of price risk, supplier risk and item risk for bids based on the evaluation of the bids. Also, the dashboard 214 graphically illustrates scores for the bids and presents information for each bid that is selectable for drill downs to display additional information describing a risk profile for each bid.

Figure 3:
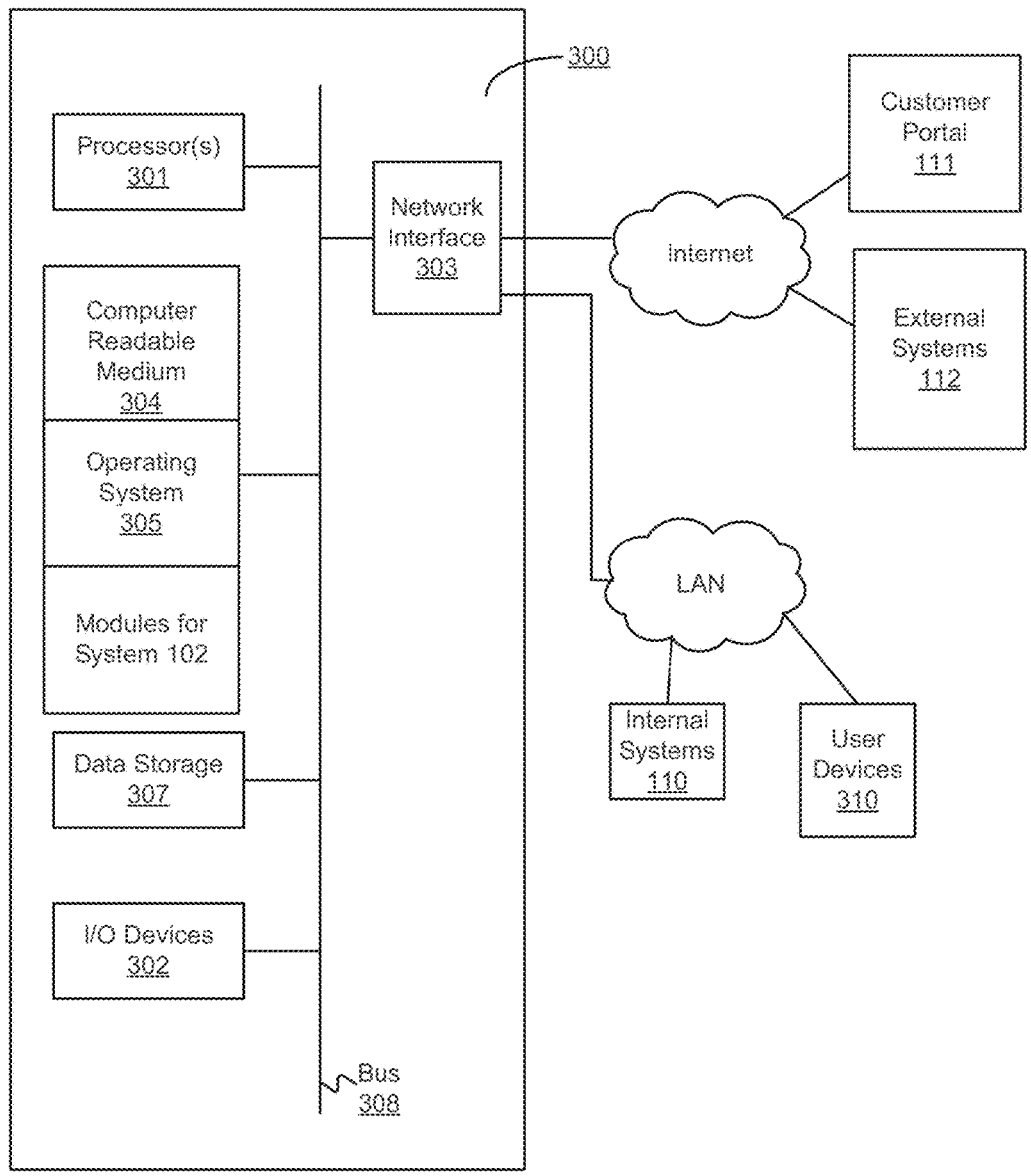
FIG. 3 shows a computer system that may be a platform for the high-risk procurement analytics and scoring system.

FIG. 3 illustrates a computer system 300 that may be used to implement the system 102. It is understood that the illustration of the computer system 300 is a generalized illustration and that the computer system 300 may include additional components and that some of the components described may be removed and/or modified. Also, the system 102 may be implemented in a distributed computing system, such as a cloud computer system. For example, the computer system 300 may represent a server that runs the system 102 or the computer system 300 may comprise one of multiple distributed servers that performs functions of the system 102.

The computer system 300 includes processor(s) 301, such as a central processing unit, ASIC or other type of processing circuit; input/output devices 302, such as a display, mouse keyboard, etc.; a network interface 303, such as one or more interfaces for connecting to a Local Area Network (LAN), a wireless 802.11x LAN, a 3G or 4G mobile WAN or a WiMax WAN, or other type of network; and a computer readable medium 304. Each of these components may be operatively coupled to a bus 308. The computer readable medium 304 may be any suitable medium which participates in providing instructions to the processor(s) 301 for execution. For example, the computer readable medium 304 may be non-transitory or non-volatile media, such as a magnetic disk or solid-state non-volatile memory or volatile media such as RAM. The instructions stored on the computer readable medium 304 may include machine readable instructions executed by the processor(s) 301 to perform the methods and functions of the system 102.

The computer readable medium 304 may store an operating system 305, such as MAC OS, MS WINDOWS, UNIX, or LINUX, and one or more applications, which include the modules for the system 102, such as shown in core 202. The operating system 305 may be multi-user, multiprocessing, multitasking, multithreading, real-time, etc.

The computer system 300 may include a data storage 307, which may include non-volatile data storage. The data storage 307 stores any data used by the system 102. The data storage 307 may be used for the data repository 203 shown in FIG. 2 or the computer system 300 may be connected to a database server (not shown) hosting the data repository 203.

The network interface 303 connects the computer system 300 to the internal systems 110, for example, via a LAN. End user devices 310 and other computer systems/servers may connect to the computer system 300 via the network interface 303. Also, the network interface 303 may connect the computer system 300 to the Internet. For example, the computer system 300 may connect to customer portals 111 and external systems 112 via the network interface 303 and the Internet.

Figure 4:
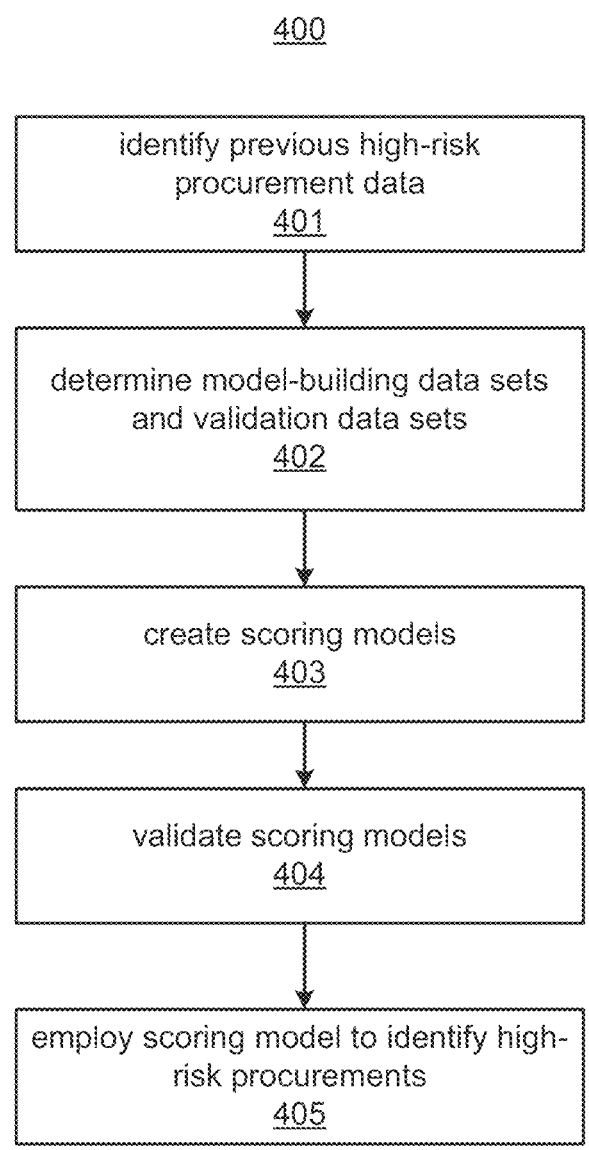
FIGS. 4-7 illustrate flow charts of methods that may be performed by the high-risk procurement analytics and scoring system or other systems.

FIG. 4 illustrates a method 400 according to an embodiment for identifying procurements that are likely to be high-risk. The method includes incorporating historical information gained from previous high-risk procurements and converts this information into scoring models that can be used to evaluate (e.g., in a near real time environment) potential procurements that are underway. The method 400 and other methods and functions described herein may be performed by the system 102 shown in FIGS. 1 and 2 by way of example. The methods may be performed in other systems.

At 401, data for previous high-risk procurements is identified. The identification of these procurements may be done through audits performed through a computer system and/or using expert analysis. The specific characteristics of those procurements are stored in a database along with the timeframe of the procurement action. These characteristics may be the variables used in the scoring models to determine if a bid is high-risk. The variables may be related to the price of procuring items, the supplier of the items, the items, etc.

At 402, model-building data sets and a validation data sets are determined from historic procurement data including the identified high-risk procurements. A significant proportion of the procurement data may be in both types of data sets to allow for development and confirmation of the models. Data mining techniques for creating the scoring model may use both procurements that were problematic (high-risk), along with those that were not. Gathering the data for the data sets occurs during this step.

At 403, the scoring models are created from the model building data sets. Advanced analytics are performed to generate the scoring models. For example, logistic regression, neural networks, decision trees, "Data Mining" regression, gradient boosting, bootstrapping, and ensemble (a method that combines the predictions from the individual models) are techniques used to build a scoring model. The analytics identify the characteristics that have the greatest predictive power and incorporates them into prediction models that create a probability that a given procurement would be high-risk.

For example, one factor that might indicate an increased probability that a high-risk procurement has been identified includes a procurement price/nomenclature relationship that exceeds the bounds of a commercially available price/nomenclature relationship. This factor may be built by combining data from the organization's procurement system with data from commercial sourcing pricing/nomenclature tables.

Table 1 below illustrates how the data may be compared. The data gleaned from this comparison could create an index value (e.g. Bid/Should Cost High Value) that is a factor to be considered in the high-risk identification process.

TABLE 1

Using Outside Data to Compare for Price Reasonableness

Data From EBS ←→ External Data

| | Bid Received | Should Cost | | | |
|---|---|---|---|---|---|
| | PR Price | Low | Median | High | |
| Ice Cube Tray | $20.00 | $0.50 | $1.25 | $2.00 | Ice Cube Tray |

The factor data is used in the advanced analytic process to build the scoring model used to identify the high-risk procurement. When that is complete, the model or models chosen can then be adjusted based on how sensitive the prediction of a high-risk procurement is selected to be. A more sensitive model may highlight more procurements as high-risk, including those that might not represent ones that are truly high-risk (false positives). A less sensitive model will have less procurements that are identified as high-risk, but run a greater probability that a true high-risk procurement won't be identified as such. The software tools allow the user/model builder to identify how sensitive the model will be.

Multiple scoring models may be generated at 403 to accommodate different areas of risk. For example, a price risk scoring model, a supplier risk scoring model and an item risk scoring model may be generated from a price risk data set, a supplier risk data set, and an item risk data set respectively. Each data set contains information relevant to its particular risk area. The data may include information associated with variables for each risk area. Also, each model may be generated using different model building techniques. However, each model may use a same scoring scale and a same scoring threshold to identify high-risk procurements, as is further described below.

The price risk scoring model may be used to identify bids that are over-priced or bids that are significantly under-priced. Significantly under-priced bids may be indicative of the supplier using counterfeit goods, and thus may be considered high-risk. The price risk scoring model may be comprised of historic price data for the last 12 months and beyond for goods or servicing being procured. The risk model may also include variables to adjust for economic conditions. For example, the variables may include a consumer price index (CPI), a producer price index (PPI) for commodities and a PPI for industries and other variables that may account for inflation or other economic conditions. The price risk scoring model identifies the "should cost" amount for items being procured.

Certain factors may be used to select the variables for the price risk scoring model. For example, commodity inflation factor data sources may be evaluated to select the inflation variable that is most relevant to the item being procured. The inflation rate may vary widely depending on the type of item being procured and an inflation rate may be selected that is for a particular type of item being procured. Geographic location, and shipping costs are examples of other variables that may be used to adjust prices or costs.

The supplier risk model includes variables that are used to identify high-risk suppliers of items being procured. The variables may vary depending on the type of item being procured and the variables may include geographic location, out-of-business indicators, legal status (e.g., corporation, partnership, sole proprietor, etc.), year started, number of employees, past procurement history with regard to supplying of items, etc. In one example, cluster analyses is performed to determine the association of each variable against the supplier being evaluated as well as a level of multicollinearity amongst the variables. Through a number of model iterations, a set of variables are selected which not only minimized multicollinearity, but are also able to accurately distinguish which suppliers are high-risk. A logistic regression may be used to identify suppliers that have a high probability of being high-risk based on the supplier risk model.

The item risk model includes variables that are used to identify high-risk items that may be supplied by a supplier for a procurement. The item risk scoring model may be used to identify bids that are high-risk based on the items being supplied by the supplier for the procurement. For example, a bid may be considered high-risk if the items being supplied by a supplier are estimated to have a high probability of being counterfeit. Some examples of variables that may be used in the item risk model may include commonality of a unit in the bid specifying the amount of the item to be supplied, the type of item (e.g., microprocessors may be considered higher risk than a fastener), geographic location of manufacturing of the item, the use of the item (e.g., military versus civilian), past supplier history with respect to providing items, etc.

At 404, the scoring models may be validated by evaluating the validation data set using the models to confirm accuracy. Validation may also protect against model over-fit, which is a condition where the model places more emphasis on a variable than might be found in the larger population of procurements in which the model would be run. By engaging in this step, an entity can gain confidence concerning the true effectiveness of the models to identify high-risk procurements outside of the modeling environment. This step is sometimes referred to as the testing or validation step.

At 405, the scoring models are incorporated into the procurement process to identify high-risk procurements. The scoring models for example may be incorporated into an automated daily review of procurements. For example, the scoring models are used to evaluate bids that are high-risk and generates alerts of the high-risk bid to the individual using the procurement system. This review may be used to administer higher level oversight and review of high-risk procurements, and tracking the number/dollar value of those procurements from a metric perspective.

Bids may be evaluated using the price risk scoring model, the supplier risk scoring model and the item risk scoring model to identify high-risk procurements. Also, evaluation capacity may be considered when evaluating bids using the models. The evaluation capacity is a number of bids that can be reviewed within a predetermined time period. The evaluation capacity may be based on the workload of an individual responsible for selecting one or more bids for procuring one or more items, which may include goods or services. The evaluation capacity may be entered by a user or otherwise determined. The evaluation capacity may be used to reduce the total number of bids to be reviewed. For example, a subset of bids are determined based on the evaluation capacity that are less than the total number of bids received.

The evaluation of bids may include determining a price risk score, a supplier risk score and an item risk score for each bid based on the models and the evaluation capacity and the information associated with each bid. The same scoring scale (e.g., 0-1000) may be used for each type of score. Also, the same threshold in the scoring scale may identify a bid as a high-risk. For example, if the threshold is 800, a price risk score, a supplier risk score and/or an item risk score greater than or equal to 800 for a bid may indicate the bid is high-risk. If the same scoring scale and scoring threshold are used for each risk area, it is easier for the user to quickly identify which bids are high-risk. Bid evaluations are further described with respect to the methods discussed below.

Figure 5:
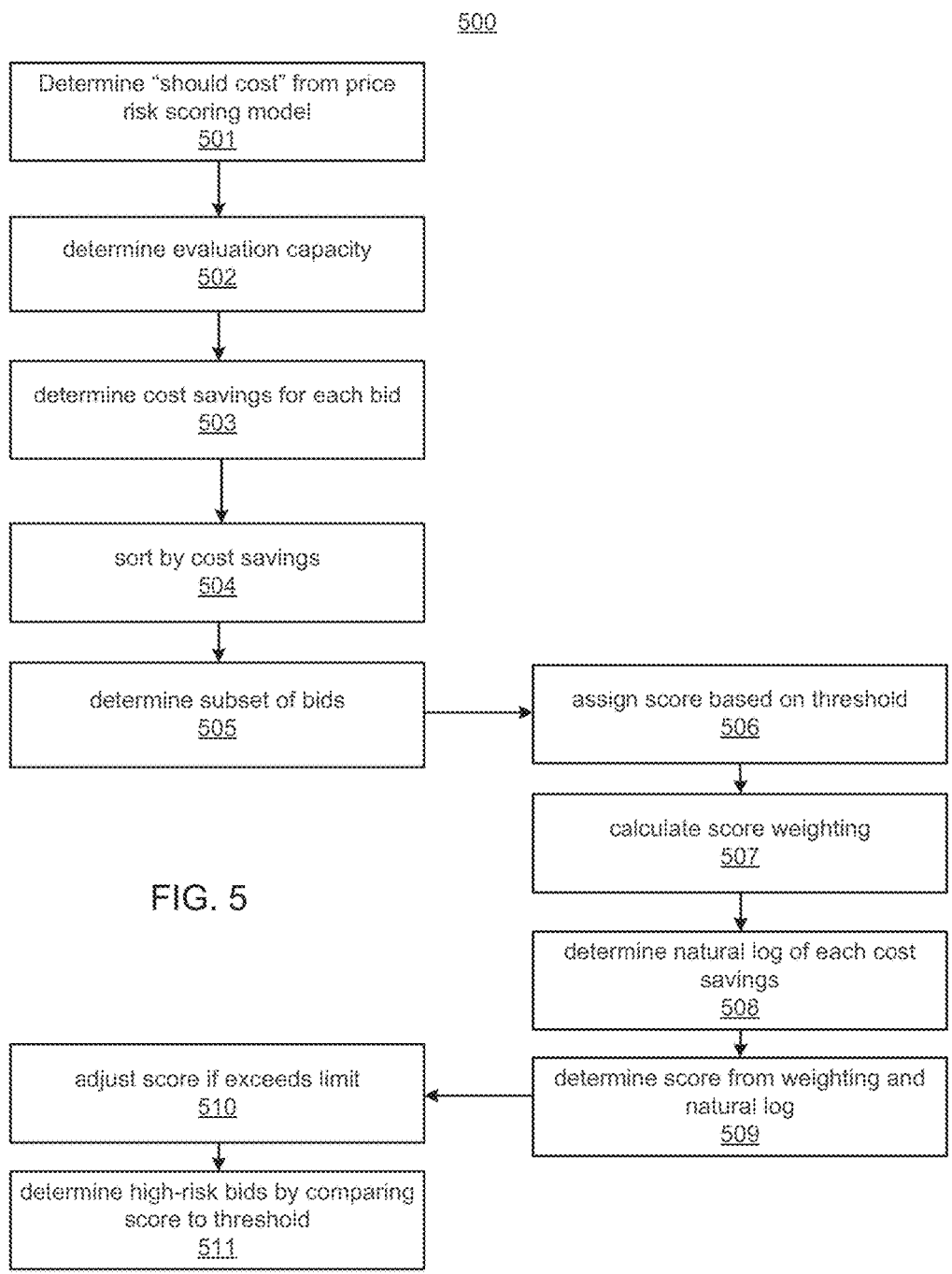

FIG. 5 illustrates a method 500 for evaluating bids according to a price risk scoring model. The price risk scoring model identifies bids that are high-risk based on price. A high-risk price may represent overpayment for a good or service if accepted. Also, a significantly under-priced bid may be considered high-risk. For example, a bid three times less than an average price may be indicative that the supplier is using counterfeit goods.

At 501, the price risk scoring model is used to determine the "should cost" price for an item being procured. The "should cost" price represents an estimation of how much should be paid for an item being procured based on historic price data for the item or related items and other variables.

In one example, to determine the "should cost" price for an item, an average item price is determined from historic price data for the item and may be adjusted for inflation or other economic conditions using an index (e.g., CPI, PPI for commodities and/or industries) or other variables in the price risk scoring model.

At 502, the evaluation capacity is determined. The evaluation capacity may be entered by a user and stored in the data storage 210 shown in FIG. 2. The evaluation capacity may be retrieved from the data storage 210.

At 503, a cost savings is determined for each bid. The cost savings may be based on the difference between the "should cost" determined at 501 and the price specified in the bid to procure an item. If the price is per item and multiple items are being procured, then the difference may be multiplied by the number of items being procured.

At 504, the bids are sorted by cost savings, for example from highest cost savings to least cost savings. At 505, a subset of the bids having the highest cost savings are selected. The number of bids in the subset may be based on the evaluation capacity. For example, if the evaluation capacity is 200, then 200 bids with the most cost savings are selected.

At 506, a score equivalent to the scoring threshold in the scoring scale is assigned to the bid in the subset with the lowest cost savings. For example, if the scoring threshold is 800, then the bid in the subset with the lowest cost savings is assigned a score of 800.

At 507, a score weighting is calculated. For example, the score weighting is calculated by taking the natural log of the cost savings for the lowest cost savings bid and then dividing it by the threshold, e.g., 800.

At 508, the natural log of the cost savings for each bid in the subset is determined. At 509, the weighting is applied to each natural log to determine the bid's score. For example, the natural log is multiplied by the calculated score weighting determined at 507.

At 510, any score over an upper limit of the scoring scale (e.g., 1000 on a scoring scale of 0-1000) is assigned to the upper limit, and any score below the lower limit (e.g., 0) is assigned the lower limit for the score.

At 511, the score for each bid is compared the scoring threshold to determine if the bid is high-risk. For example, if the bid's score exceeds the threshold it is marked as high-risk and a notification may be generated for example via the dashboard 214 or message may be sent to a bid evaluator.

Figure 6:
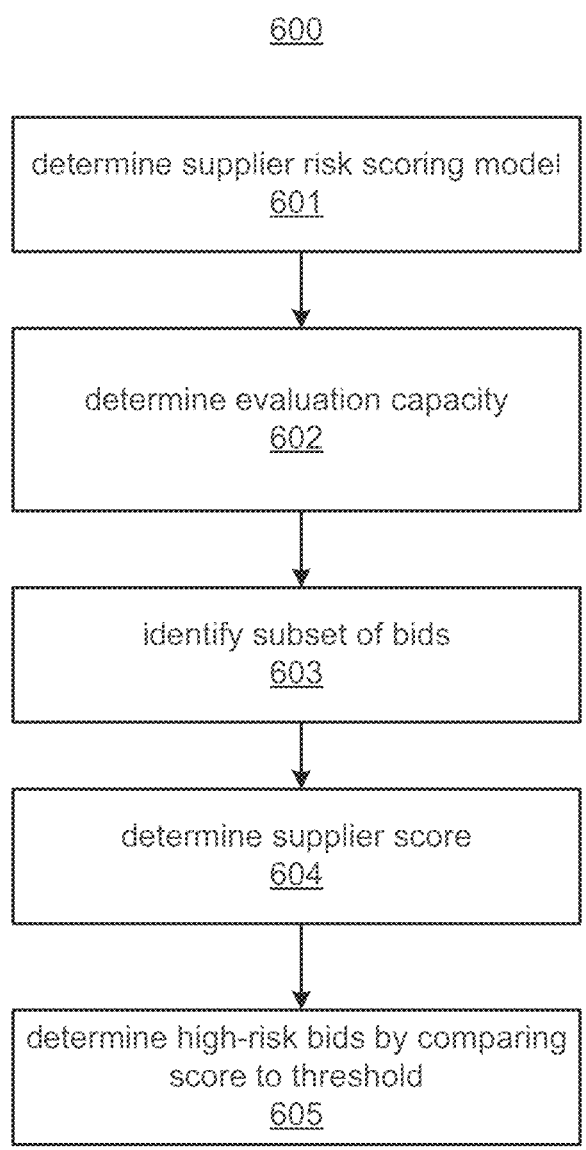

FIG. 6 illustrates a method 600 for evaluating bids according to a supplier risk scoring model. The supplier risk scoring model may be used to identify bids that are high-risk based on the supplier of the items being procured. For example, some suppliers may be considered "bad actors" based on previous procurement actions. For example, the supplier may have previously been found to provide counterfeit goods or was accused or indicted for fraud. Bids from these types of suppliers may be considered high-risk.

At 601, the supplier risk scoring model is determined. For example, the supplier risk model may be stored in the data storage 210 and may be retrieved to evaluate bids. The supplier risk model may be adjusted depending on the type of items being procured. For example, the supplier risk model may include a geographic location of the supplier as a variable. The variable may be weighted differently depending on the type of item being procured.

At 602, the evaluation capacity is determined. The evaluation capacity may be entered by a user and stored in the data storage 210 shown in FIG. 2. The evaluation capacity may be retrieved from the data storage 210.

At 603, a subset of bids are identified based on the evaluation capacity. For example, the subset may be determined based on cost savings and the evaluation capacity as described in the method 400.

At 604, a supplier score is determined based on the supplier risk model for each bid. For example, logistic regression is applied to compare the variables in the supplier risk model to the characteristics of the supplier for each bid to determine the supplier risk score in the scoring scale. In one example, business rules may be used to determine the supplier risk score. For example, if the supplier is determined to be on a barred list for the procurement, the bid is given the maximum score of 1000.

At 605, the supplier risk score for each bid is compared to the scoring threshold to determine if the bid is high-risk. For example, if the bid's supplier score exceeds the threshold it is marked as high-risk and a notification may be generated for example via the dashboard 204 or message may be sent to a bid evaluator.

Figure 7:
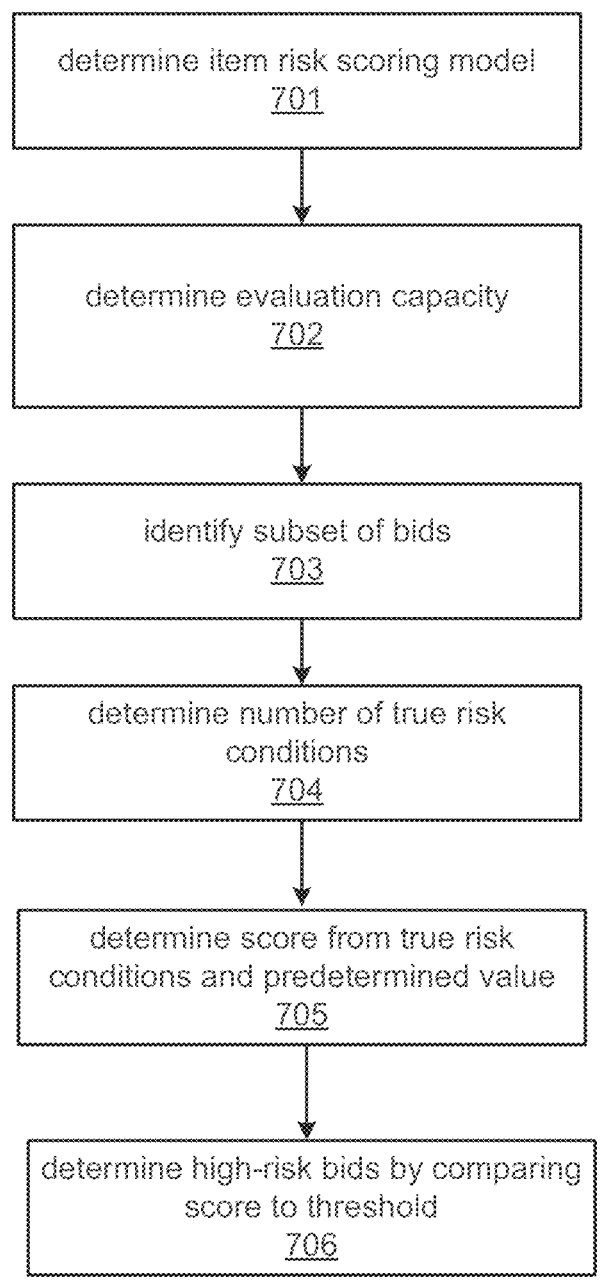

FIG. 7 illustrates a method 700 for evaluating bids according to an item risk scoring model. The item risk scoring model may be used to identify bids that are high-risk based on the items being supplied by the supplier for the procurement. For example, a bid may be considered high-risk if the items being supplied by a supplier are estimated to have a high probability of being counterfeit.

At 701, the item risk scoring model is determined. For example, the item risk model may be stored in the data storage 210 and may be retrieved to evaluate bids. The item risk model may be adjusted depending on the type of items being procured.

At 702, the evaluation capacity is determined. The evaluation capacity may be entered by a user and stored in the data storage 210 shown in FIG. 2. The evaluation capacity may be retrieved from the data storage 210.

At 703, a subset of bids are identified based on the evaluation capacity. For example, the subset may be determined based on cost savings and the evaluation capacity as described in the method 400.

At 704, a number of true risk conditions is determined for each bid. For example, variables in the item risk model may represent risk conditions, such as whether the bid contains an uncommon unit, whether the bid is for supplying a microprocessor, whether manufacturing is performed overseas, etc. Examples of assigning true conditions for these variable may include, if the unit in the bid is uncommon it is assigned a "1" (i.e., a true risk condition), otherwise it is assigned a "0". If the item is a microprocessor, the bid is assigned a "1". If the item is manufactured overseas, the bid is assigned a "1". The total number of true risk conditions are determined for each bid.

At 705, the number of true risk conditions is multiplied by a predetermined value to determine an item risk score in the scoring scale for each bid in the subset. The predetermined value may be based on the scoring scale used.

At 706, the item risk score for each bid is compared to the scoring threshold to determine if the bid is high-risk. For example, if the bid's supplier score exceeds the threshold it is marked as high-risk and a notification may be generated for example via the dashboard 204 or message may be sent to a bid evaluator.

Figure 8A:
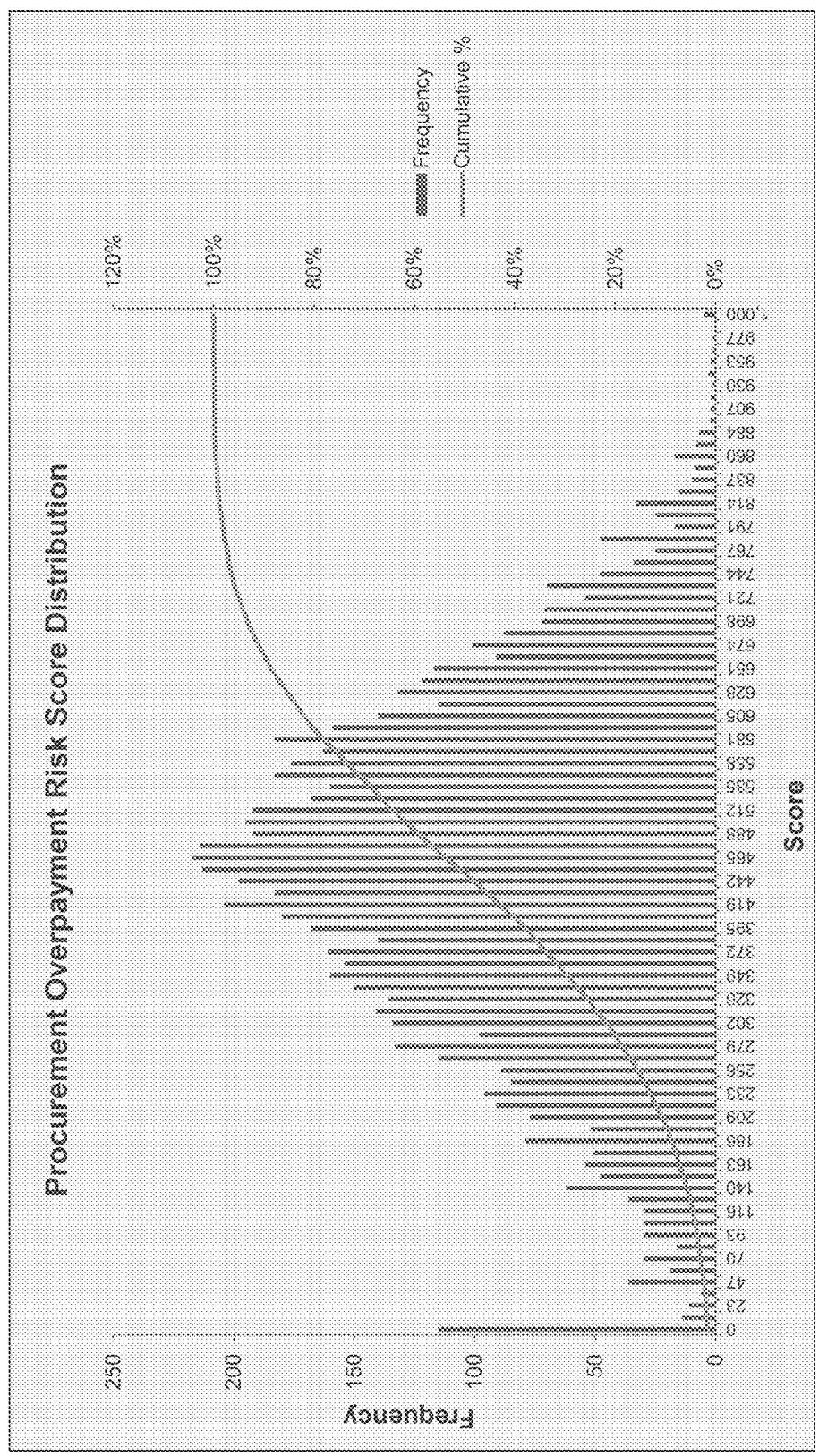
FIGS. 8A-C show examples of price risk scores, supplier risk scores and item risk scores on a scoring scale.
Figure 8B:
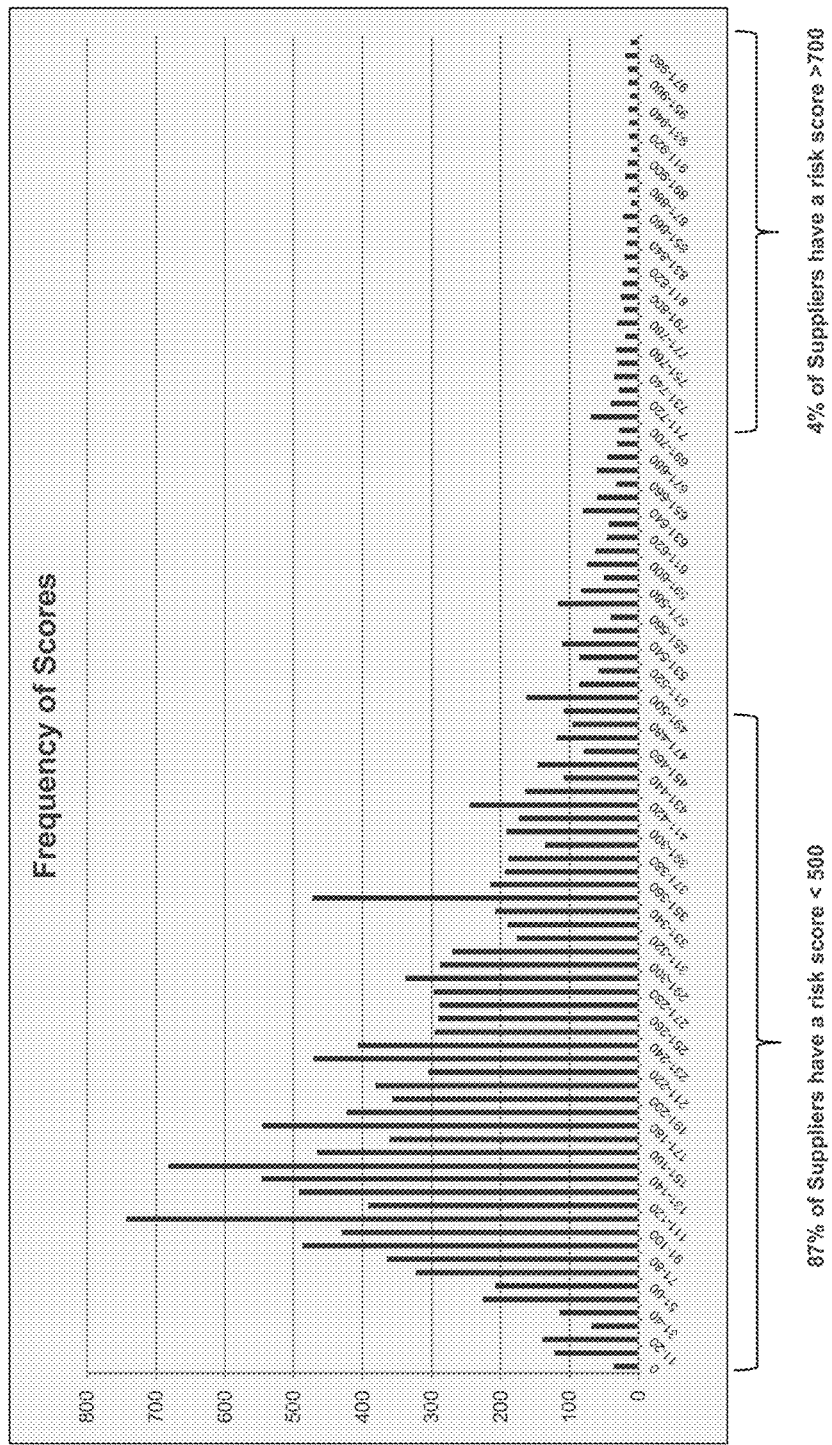
Figure 8C:
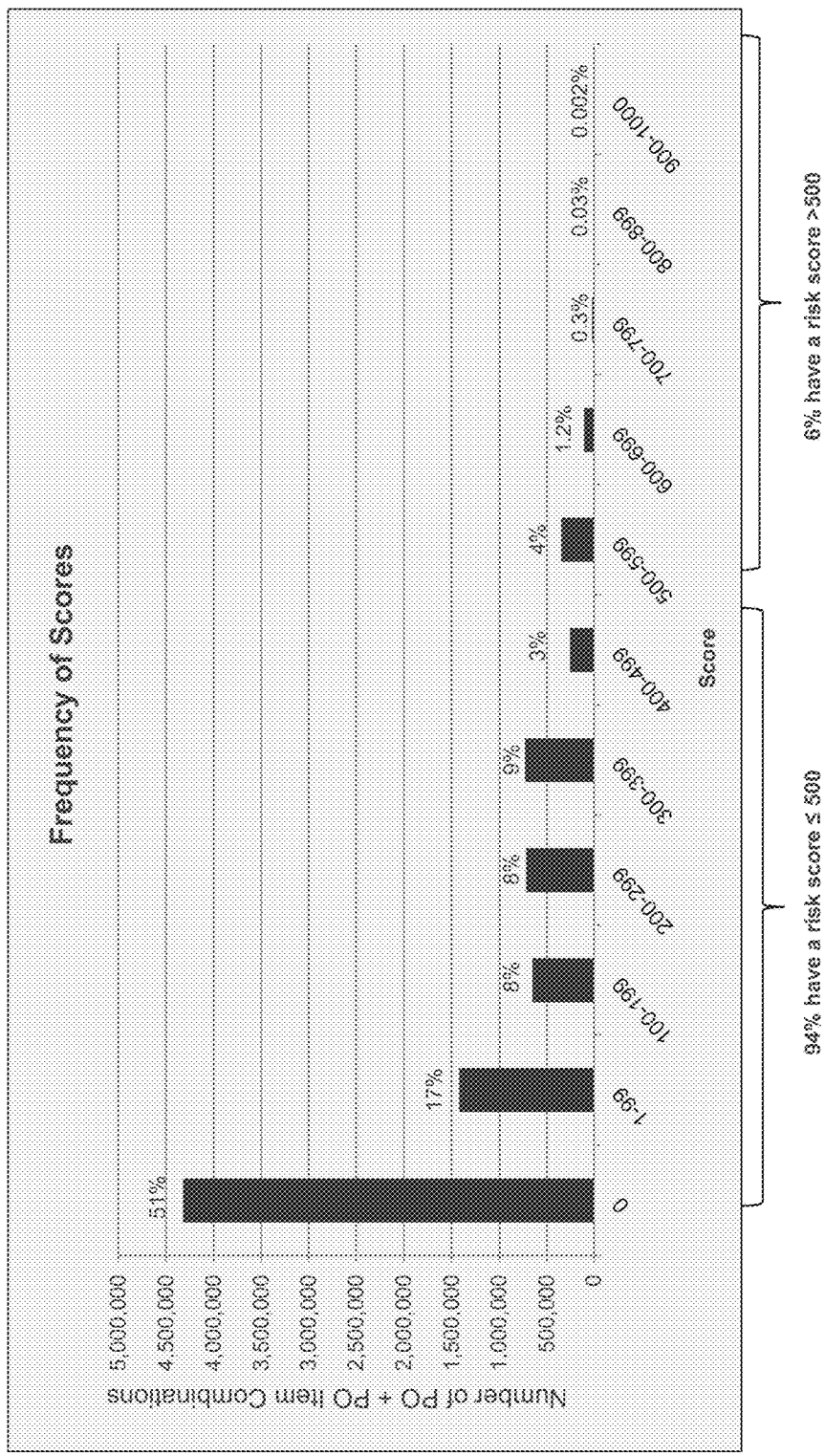

FIGS. 8A-C show examples of price risk scores, supplier risk scores and item risk scores on the scoring scale from 0-1000. FIG. 8A shows the frequency of the price risk scores for bids for a procurement. FIG. 8A also shows a curve representing the cumulative frequency. In this example the threshold is 700, and only a small percentage of the total bids in this example are considered high-risk. FIG. 7B shows the frequency of the supplier risk scores for the bids for the procurement. In this example, 4% are considered high-risk. FIG. 7C shows the frequency of the item risk scores for the bids for the procurement. 6% are greater than 500 and an even smaller percentage are greater than 700.

The dashboard 214 shown in FIG. 2 may generate screenshots of the scores determined by the system 102. Examples of the screenshots are described with respect to FIGS. 9-13. Also, scores may be selected to provide drill downs to display additional information related to the scores. FIG. 9 shows an example of a screenshot illustrating scores for bids provided by the fictitious companies James Brother Construction, Quincy Engineering and F&T Sales and Service. The scores are 967, 810 and 930. In this example, only the highest score is shown but multiple scores may be generated for each bid, such as a price risk score, a supplier risk score and an item risk score. As shown, 967 and 930 are price risk scores and 180 is a supplier risk score. Also, the company, the score or the risk factor may be selected by a user for drill downs to get additional information.

Figure 10:
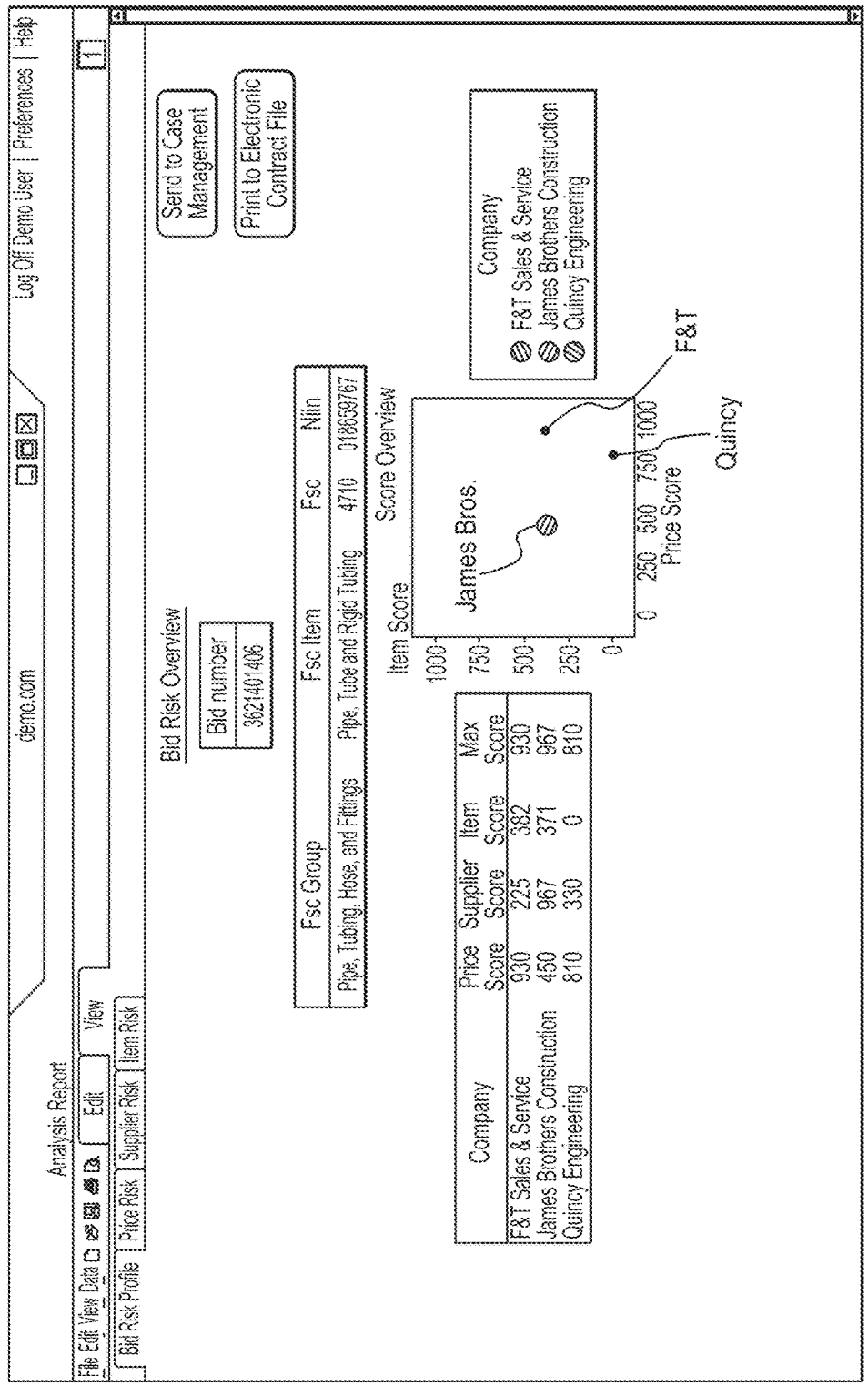

FIG. 10 illustrates an example of a screenshot showing a bid risk profile. The price risk score, a supplier risk score and an item risk score are shown for each company, along with the maximum score. If 800 is the threshold, the bids for all these companies may be considered high-risk because the maximum scores exceed the threshold. A graphic representation of the maximum scores may also be provided as shown. FIG. 10 also shows a graphic representation of the score overview for the three bids based on item and price score. The graphic representation of the score overview allows a user to quickly identify which is the best bid in terms of the item and price scores in this example. For example, James Brothers is shown as having the best scores in terms of item and price.

Figure 11A:
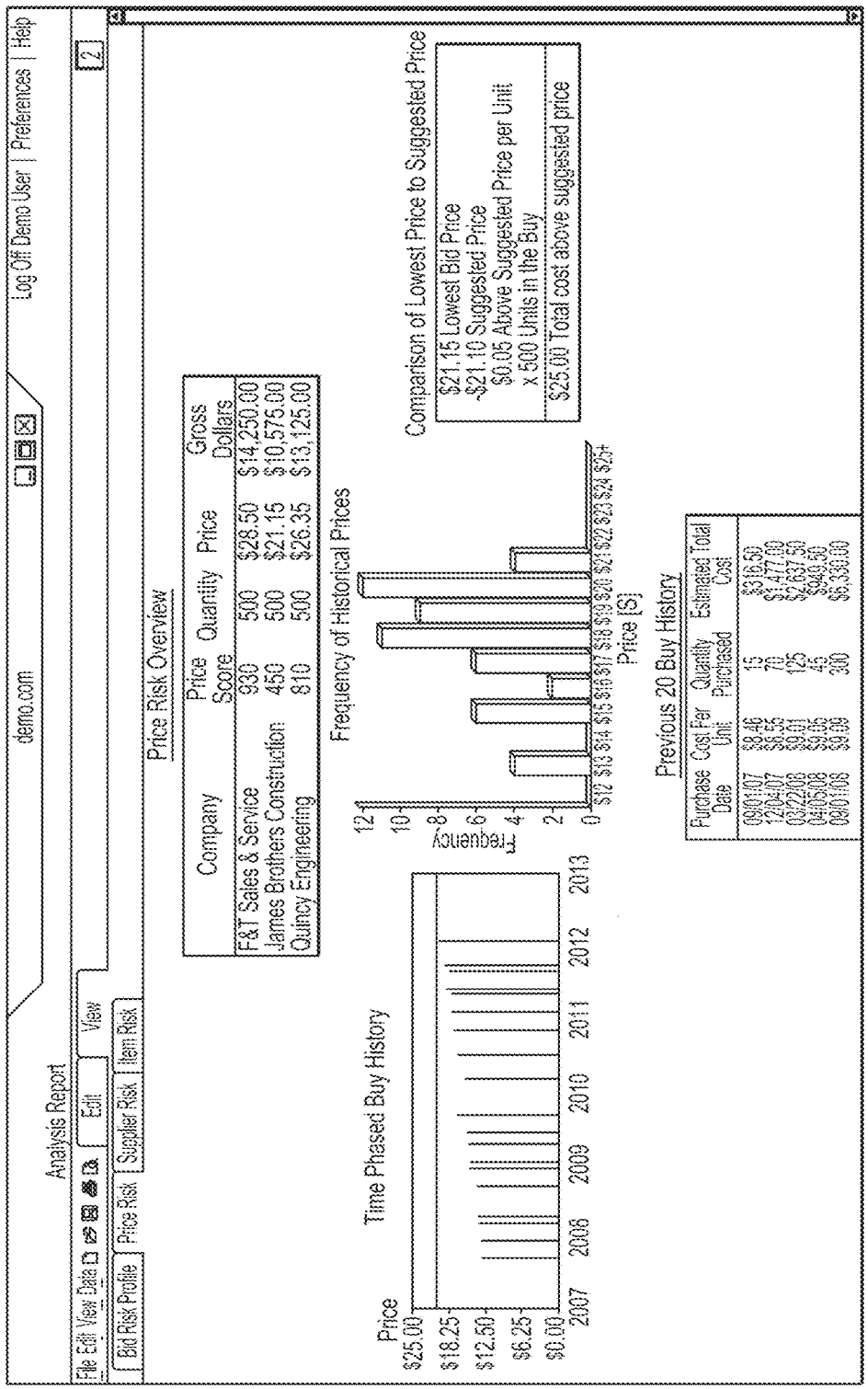
Figure 11B:
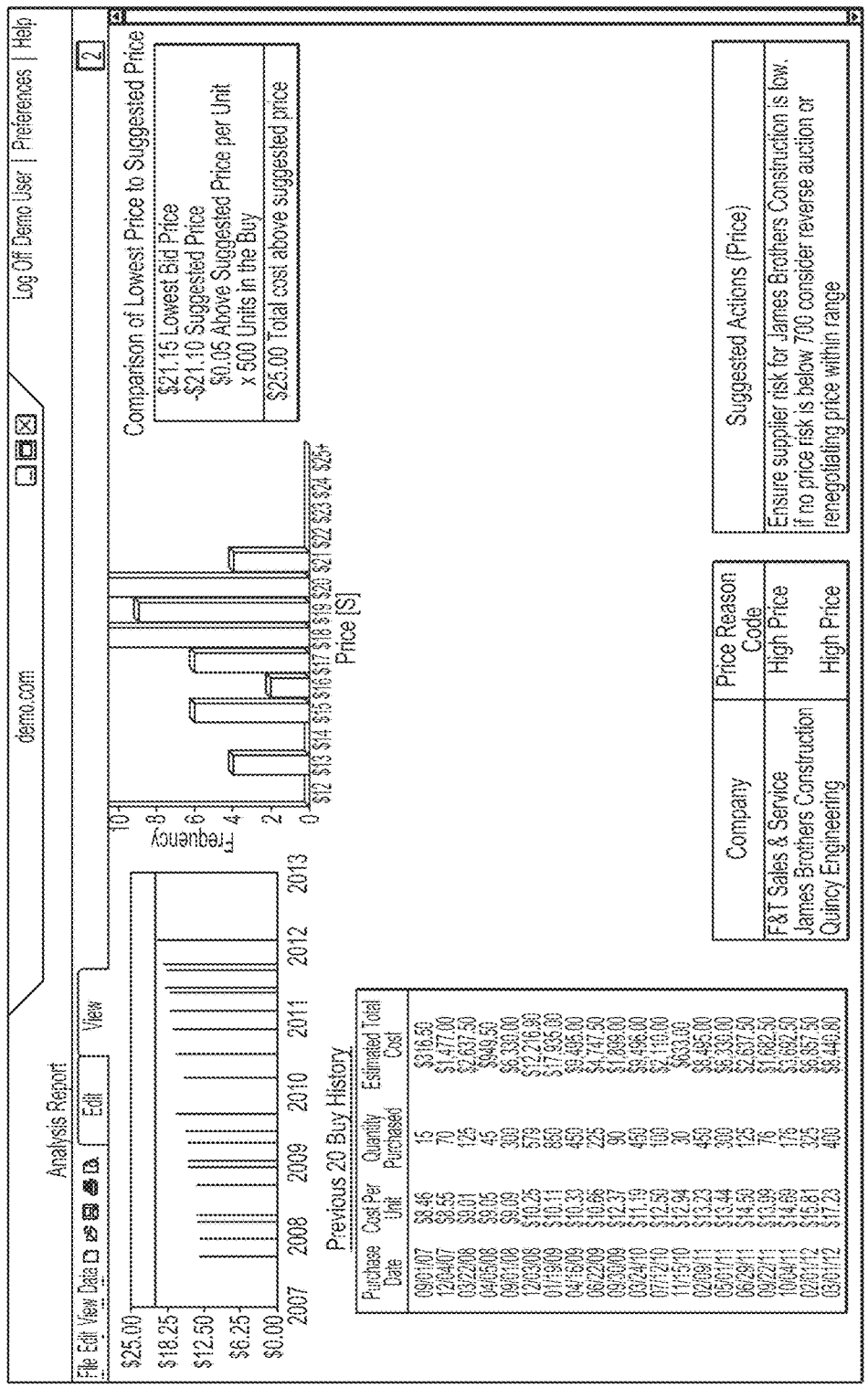

FIGS. 11A-B show an example of a screenshot for a price risk drill down. FIGS. 11A-B show the same screen but it is scrolled down in FIG. 11B to show the features that are not viewable in FIG. 11A. A similar format is used for FIGS. 12A-B. As shown in FIG. 11A, scores are provided for each company. If a score is above the threshold, it may be color coded red or another alert may be generated to indicate it is high-risk. FIG. 11A shows information related to historical price data for the item being procured, such as a time-phased history, a frequency of historical prices and a previous buy history for the item. FIG. 11A also shows a comparison of the lowest bid price, which is provided by James Brother Construction, to the suggested or should cost price. FIG. 11B shows examples of notes and suggested actions. The system 102 shown in FIG. 1 may determine the suggested actions based on the scores.

Figure 12A:
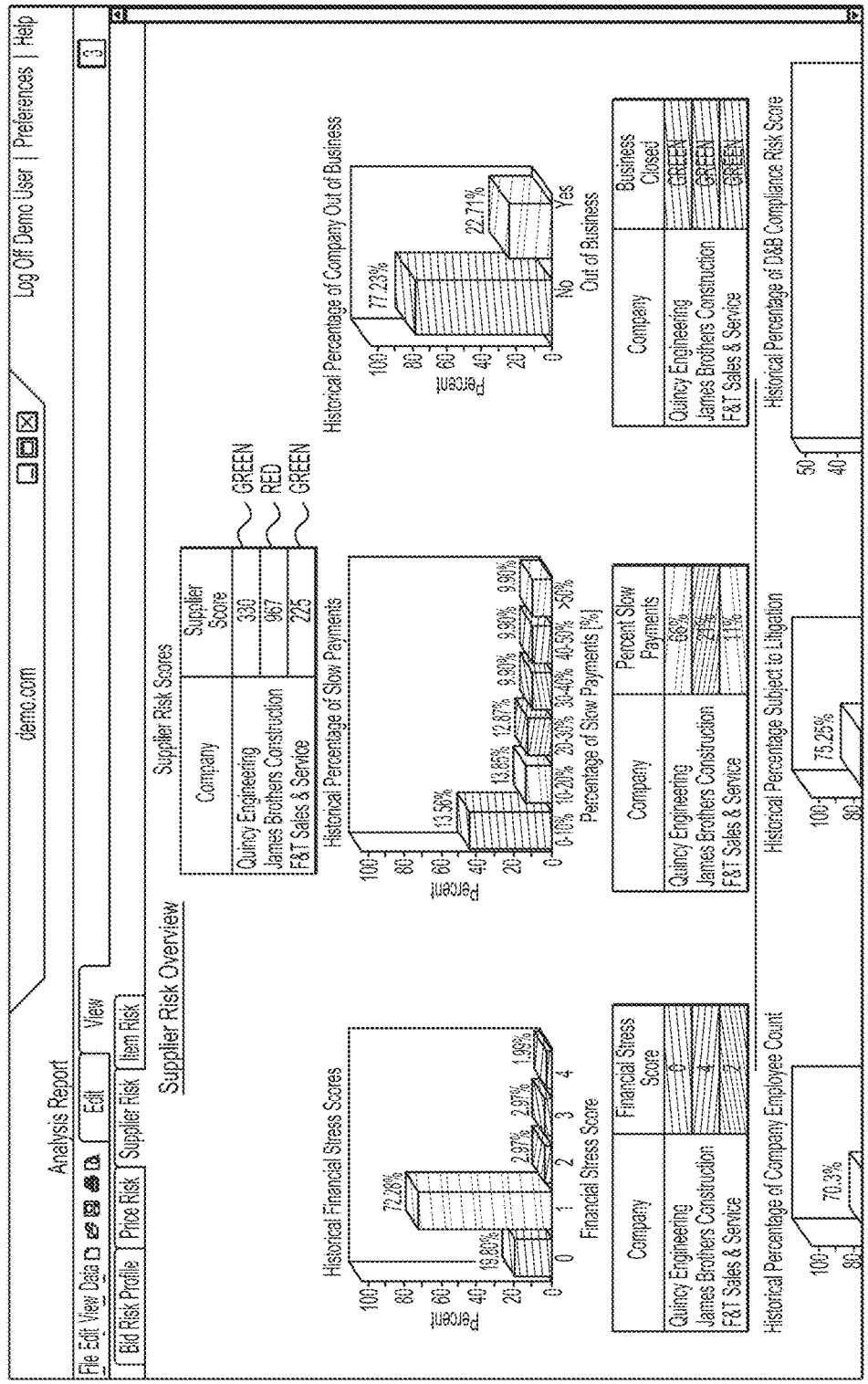
Figure 12B:
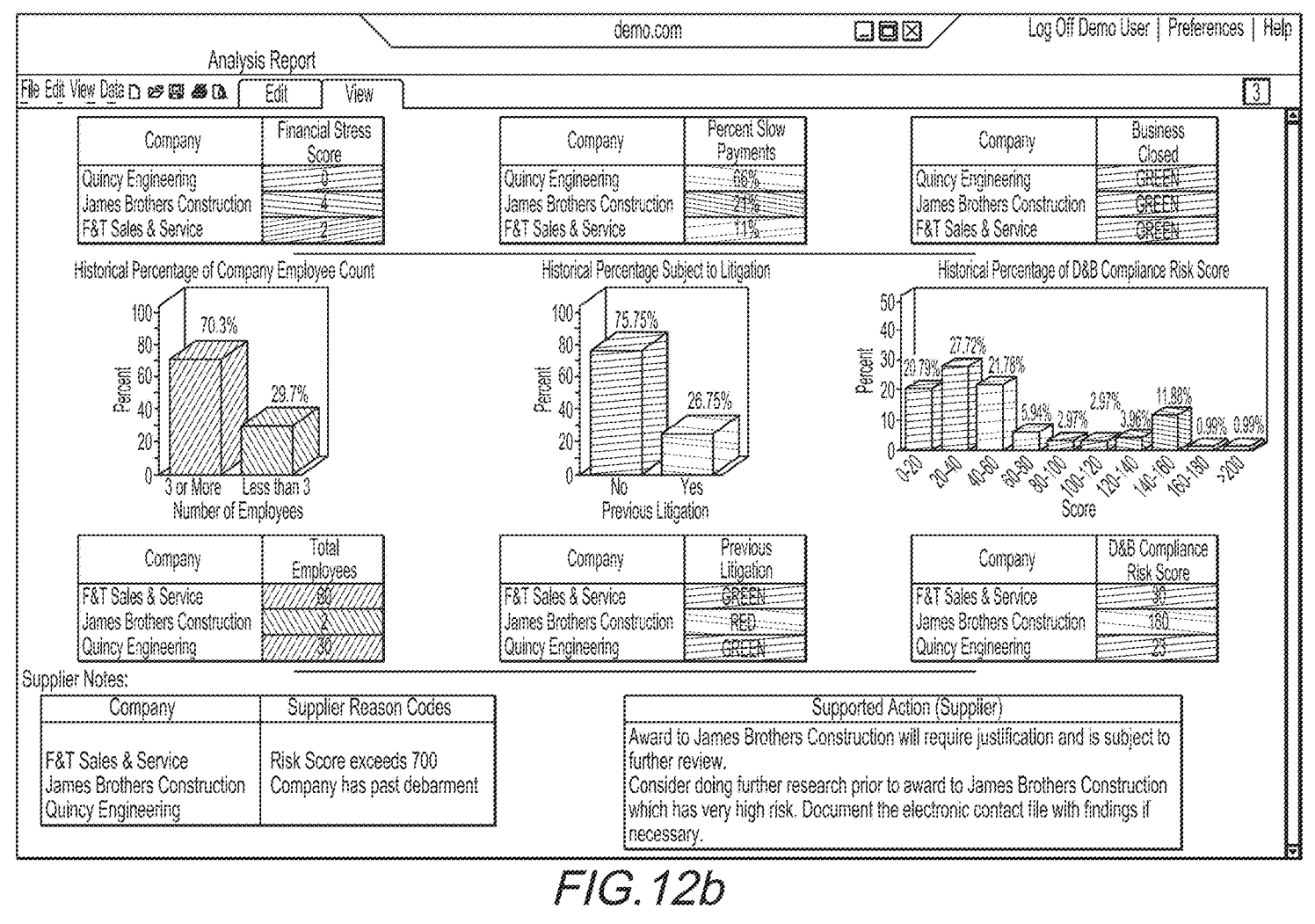

FIGS. 12A-12B show an example of a screenshot for a supplier risk drill down. Historical information for variables used in the supplier risk model are shown. Also, values for the variables for each company are also shown. For example, the variables are financial stress, slow payments, out of business, employee count, and subject to litigation. Scores may be color coded or other type of markings may be used to allow a user to quickly identify whether a score or risk may be problematic. Also, examples of notes and suggested actions are also shown.

FIG. 13 shows an example of a screenshot for an item risk drill down. Examples of key flags are shown, which may represent variables in the item risk model. The key flags may be color coded to represent whether their values are ok or problematic. For example, a key flag that is determined to be a true risk condition is shown as red and a key flag that is determined not to be a true risk condition is shown as green. Also, examples of notes and suggested actions are shown.

While the embodiments have been described with reference to examples, those skilled in the art will be able to make various modifications to the described embodiments without departing from the scope of the claimed embodiments.

What is claimed is:

1. A machine learning system comprising:
a data storage storing data to be classified; and
at least one processor to:
receive a model building data set including data from at least one data source;
determine a machine learning model from the model building data set;
determine a first set of predictive variables to be used in the machine learning model;
test the machine learning model on a validation data set;
remove or replace at least one of the predictive variables in the first set to generate a second set of predictive variables;
select either the first set of predictive variables or the second set of predictive variables to be used in the machine learning model, including to:
determine if the machine learning model is different when using the first set of predictive variables and the second set of predictive variables model; and
determine if the removed or replaced at least one of the predictive variables of the first set is to be kept for use in the machine learning model based on the determination of whether the machine learning model is different when using the first set of predictive variables and the second set of predictive variables; and
classify, by the machine learning model, the data in the data storage.

2. The machine learning system of claim 1, wherein the at least one processor is to:
generate an output of classifications determined by a first version of the machine learning model including the first set of predictive variables;
generate an output of classifications determined by a second version of the machine learning model including the second set of predictive variables; and
compare the output of the first version of the machine learning model and the output of the second version of the machine learning model.

3. The machine learning system of claim 2, wherein the at least one processor is to select either the first set of predictive variables or the second set of predictive variables to be used in the machine learning model based on predictive power of the first set of predictive variables and predictive power of the second set of predictive variables.

4. The machine learning system of claim 2, wherein the at least one processor is to:
determine the predictive variables to be used in the machine learning model from the selected set of predictive variables;
determine collinearity between the determined predictive variables; and
select a third set of predictive variables from the determined predictive variables that minimizes multicollinearity between the predictive variables in the third set based on the determined collinearity.

5. The machine learning system of claim 1, wherein the at least one processor is to:
determine an evaluation capacity to review the classifications in a predetermined period of time; and
control a rate of the classifying performed by the tested machine learning model based on the evaluation capacity.

6. A machine learning system comprising:
a network interface to interface with one or more data sources over a network to receive data;
a data storage device to store a model building data set and a validation data set determined from the received data;
at least one processor;
a model generator comprising machine readable instructions stored on a non-transitory computer readable medium and executed by the at least one processor, to:
determine a machine learning model from the from the model building data set and to store the machine learning model in the data storage;
determine a first set of predictive variables to be used in the machine learning model;
test the machine learning model on a validation data set;
remove or replace at least one of the predictive variables in the first set to generate a second set of predictive variables;

select either the first set of predictive variables or the second set of predictive variables to be used in the machine learning model, including to:
determine if the machine learning model is different when using the first set of predictive variables and the second set of predictive variables model; and
determine if the removed or replaced at least one of the predictive variables of the first set is to be kept for use in the machine learning model based on the determination of whether the machine learning model is different when using the first set of predictive variables and the second set of predictive variables; and
classify, by the machine learning model, the data in the data storage.

7. The machine learning system of claim 6, wherein the model generator is to:
generate an output of classifications determined by a first version of the machine learning model including the first set of predictive variables;
generate an output of classifications determined by a second version of the machine learning model including the second set of predictive variables; and
compare the output of the first version of the machine learning model and the output of the second version of the machine learning model.

8. The machine learning system of claim 7, wherein the model generator is to select either the first set of predictive variables or the second set of predictive variables to be used in the machine learning model based on predictive power of the first set of predictive variables and predictive power of the second set of predictive variables.

9. The machine learning system of claim 7, wherein the model generator is to:
determine the predictive variables to be used in the machine learning model from the selected set of predictive variables;
determine collinearity between the determined predictive variables; and
select a third set of predictive variables from the determined predictive variables that minimizes multicollinearity between the predictive variables in the third set based on the determined collinearity.

10. The machine learning decision tree system of claim 6, wherein the model generator is to:
determine an evaluation capacity to review the classifications in a predetermined period of time; and
control a rate of the classifying performed by the tested machine learning model based on the evaluation capacity.

11. A method of building a machine learning model comprising:
interfacing with one or more data sources over a network to receive data;
creating a data structure in a data storage device to store the data;
storing a model building data set in the data structure in the data storage device, wherein the model building data set is determined from the received data;
determining a machine learning model from the model building data set;
determining a first set of predictive variables to be used in the machine learning model;
testing the machine learning model on a validation data set;
removing or replacing at least one of the predictive variables in the first set to generate a second set of predictive variables;
selecting either the first set of predictive variables or the second set of predictive variables to be used in the machine learning model, including to:
determine if the machine learning model is different when using the first set of predictive variables and the second set of predictive variables model; and
determine if the removed or replaced at least one of the predictive variables of the first set is to be kept for use in the machine learning model based on the determination of whether the machine learning model is different when using the first set of predictive variables and the second set of predictive variables; and
classifying, by the machine learning model, the received data.

12. The method of claim 11, comprising:
storing the validation data set in the data structure in the data storage device, wherein the validation data set is determined from the received data; and
wherein the testing of the machine learning model on the validation data set is prior to classifying at least a portion of the received data with the machine learning model.

13. The method of claim 11, wherein selecting either the first set of predictive variables or the second set of predictive variables to be used in the machine learning model comprises:
generating an output of classifications determined by a first version of the machine learning model including the first set of predictive variables;
generating an output of classifications determined by a second version of the machine learning model including the second set of predictive variables; and
comparing the output of the first version of the machine learning model and the output of the second version of the machine learning model to select either the first set of predictive variables or the second set of predictive variables to be used in the machine learning model.

14. The method of claim 13, wherein selecting either the first set of predictive variables or the second set of predictive variables to be used in the machine learning model comprises:
selecting either the first set of predictive variables or the second set of predictive variables to be used in the machine learning model based on predictive power of the first set of predictive variables and predictive power of the second set of predictive variables.

15. The method of claim 14, comprising:
determining the predictive variables to be used in the machine learning model from the selected set of predictive variables;
determining collinearity between the determined predictive variables; and
selecting a third set of predictive variables from the determined predictive variables that minimizes multicollinearity between the predictive variables in the third set based on the determined collinearity.

16. The machine learning system of claim 1, wherein the machine learning model comprises a decision tree classifier.

* * * * *